April 9, 1935. D. D. WILE 1,996,943
FLUID MEASURING DEVICE
Filed Dec. 19, 1929
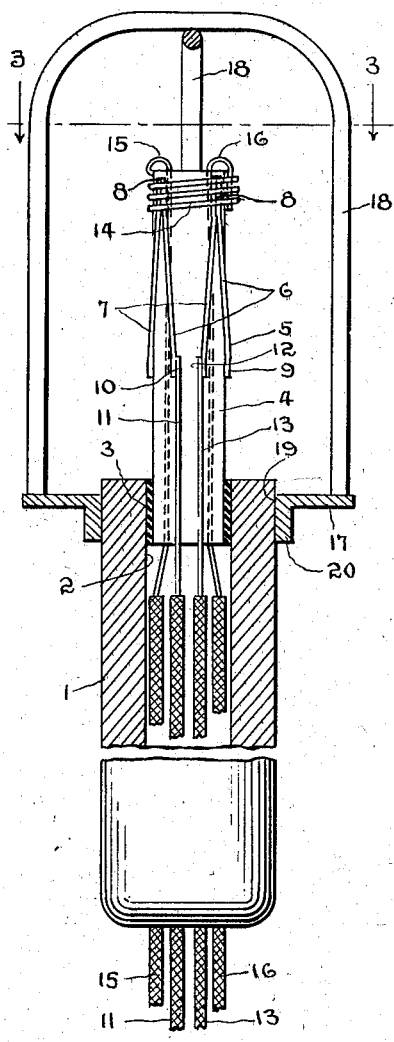
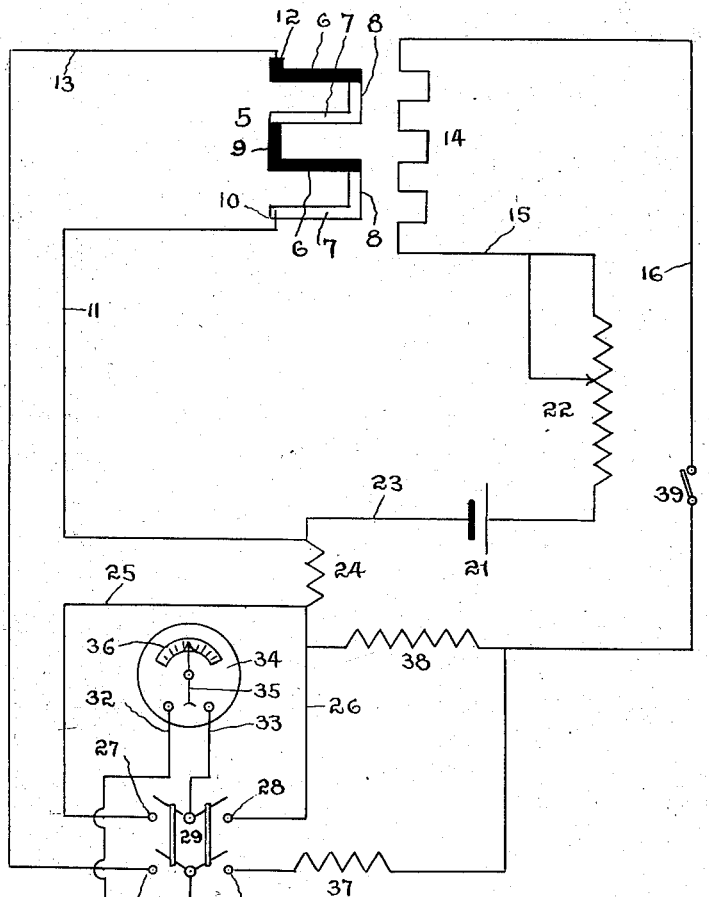
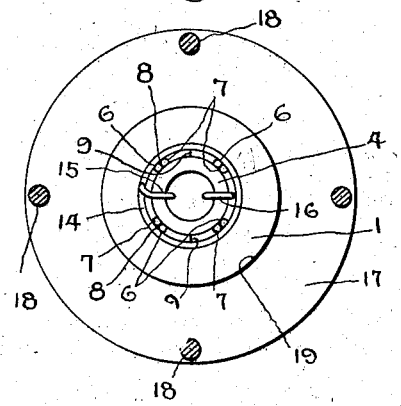
Inventor
Daniel D. Wile
By his Attorney Patented Apr. 9, 1935

1,996,943

UNITED STATES PATENT OFFICE 1,996,943

FLUID MEASURING DEVICE

Daniel D. Wile, Detroit, Mich., assignor to Detroit Lubricator Company, Detroit, Mich., a corporation of Michigan Application December 19, 1929, Serial No. 415,259

15 Claims. (Cl. 73—167)

My invention relates to new and useful improvements in means for measuring the state of a fluid, and particularly to a novel apparatus or device for measuring the rate of flow of a fluid.

If a body is supplied with energy at a constant rate sufficient to heat the body to a temperature higher than the temperature of a fluid, a state or characteristic of which is to be measured, then there will be a heat flow from the body to the fluid. Should the body be positioned in a flowing fluid, then the greater the velocity of the fluid, the more rapid will be the transfer of heat to the fluid or withdrawal of heat from the body by the fluid and the lower will be the temperature of the body, until at infinite velocity the temperature of the body will be substantially that of the temperature of the fluid. The temperature of the body will therefore be an indication of the state of the fluid or of its velocity if flowing. By employing means responsive to the temperature of the body which will automatically compensate for variation in the temperature of the fluid, the state of the fluid or of its velocity if flowing will be indicated by the responsive means irrespective of variation in temperature of the fluid.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated a preferred apparatus embodying my invention, in which drawing—

Figure 1 is a diagrammatic view of my apparatus showing the electric circuits employed therein;

Fig. 2 is an enlarged detail view, partially in vertical central section, of a part of my apparatus, and Fig. 3 is a view in section on the line 3—3 of Fig. 2.

Referring to the drawing by characters of reference, 1 designates a base or handle member of tubular construction having a longitudinal bore 2 therethrough. Fixed in one end of bore 2, as at 3, and projecting from member 1, is a hollow open-ended rod or bar supporting member 4, preferably of material having a low thermal and electrical conductivity such, for example, as glass or hard rubber. Secured to the outer surface of member 4 by shellac or a like insulating medium, is a thermopile or multiple junction thermocouple 5 composed of wires or strips of metal 6, 7, the wires 6 being preferably of bismuth, and the wires 7 being preferably of a platinum iridium alloy. The wires 6, 7 extend lengthwise of the member 4 with the hot junctions 8 positioned adjacent the free end of member 4 and spaced about the periphery thereof and with the cold junctions 9 likewise spaced about member 4 and extended toward the handle 1. From the positive terminal 10 of the thermopile 5 extends a lead wire 11, and from the negative terminal 12 extends a lead wire 13, the wires 11 and 13 preferably passing along member 4 and through the handle bore 2. Fixed on the member 4 adjacent junctions 8 is a heater element 14 of material having a low temperature coefficient of resistance, such, for example, as an alloy of chromium, nickel and iron. The element 14 is preferably wrapped or coiled about the end of member 4 and overlies the junctions 8 to aid in securing the thermopile to the member 4, the turns of element 14 being insulated from one another by shellac or the like, which also serves to secure the coiled element in position. Extending from the terminals of the element 14 are lead wires 15, 16 which extend through the bore of member 4 and the handle bore 2. The thermopile 5 and heater element 14 are preferably provided with a guard member comprising a plate member 17 carrying substantially U-shaped inverted frame members 18 which are rigid with member 17. The handle member 1 fits and is secured in a central aperture 19 in the member 17, which has a depending supporting flange 20 which engages the member 1.

A source of electrical energy 21, such as a dry battery, is provided for the element 14 and has its negative pole or terminal connected to the heater lead wire 15, in which is positioned a rheostat 22 for regulating and maintaining constant the current flow through the element 14. Connected to the positive pole or terminal of battery 21 is a wire 23 which is joined to the lead wire 11, the junction being connected to one end of a resistance element 24. Connected to the opposite end of the element 24 are wires 25, 26 which connect to opposite positive terminals 27, 28 of an electric switch 29, preferably of the double pole, double throw type. The wires 13 and 16 are connected respectively to the opposite negative terminals 30, 31 of the switch 29. The blades of the switch 29 are connected by wires 32, 33 to the terminals of a galvanometer 34, or the like, having a needle or pointer 35 responsive to electromotive force and movable over a scale 36 calibrated in accordance with the measurement to be indicated, for example, the scale may be calibrated in units of velocity. In the wire 16 is a series resistance 37 and between wires 16 and 26 is a shunt resistance 38, the resistances 37 and 38 being of proper value to convert the galvanometer 34 into an ammeter for indicating the current flow through the heater 14. A switch 39 is preferably incorporated in the heater circuit for making and breaking the current flow through the heater element.

The operation of my device is as follows: The switch 39 is closed and the switch 29 is thrown to connect terminals 28, 31 to leads 33, 32, respectively, the galvanometer being converted to an ammeter by the resistances 37, 38. The rheostat 22 is then adjusted to regulate the current flow through the heater element 14 to a constant predetermined value which will heat the element 14 to a temperature higher than the temperature of the fluid, such that at zero velocity the electromotive force generated by the thermopile 5 will move the needle 35 clockwise through its range of movement. When the heater current has been adjusted, contact is broken at leads 28 and 31 and is made by the switch 29 at contacts 27 and 30, which cuts out the resistance 37 and connects the galvanometer 34 in the thermopile circuit. The thermopile 5 will generate an electromotive force proportional to the difference between the temperature of the heater 14 and the temperature of the fluid. Since the thermopile 5 will be positioned in the fluid, the cold junctions 9 thereof will be at the temperature of the fluid so that the thermopile will automatically compensate for any variation in temperature of the fluid, and the electromotive force of the thermopile will be constant at any given fluid velocity, regardless of changes in the temperature of the fluid. At zero fluid velocity the heater 14 will be at its maximum temperature, causing the maximum temperature difference between the hot and cold junctions 8, 9 of the thermopile 5, resulting in generation of the maximum electromotive force which will be visibly indicated by the position of the galvanometer needle 35 with respect to the scale 36. When fluid flows over the heater 14 and the thermopile 5, the temperature of the heater 14 will decrease, due to the cooling action of the flowing fluid, which will result in the generation of a smaller electromotive force by the thermopile with a consequent counterclockwise movement or change in the position of the needle 35, which will indicate the velocity of the flowing fluid. The scale 36 may be calibrated in velocity units by moving the heater 14 and thermopile 5 through space at predetermined velocities and marking the scale 36 at the points to which the needle 35 moves for the different given velocities. The galvanometer 34 may be adjusted to read between any desired velocities by means of the resistances 22 and 24 and comprises in conjunction with the thermopile 5 a thermoelectric measuring means. In initially calibrating the instrument, the current flow to the heater 14 is regulated by the resistance 22 such that the throw of the needle 35 between the desired maximum and minimum velocities will be equal to the length of the scale 36. The resistance value of the resistance 24 is then determined so that the electromotive force of the thermopile 5 will be biased or counteracted by a portion of the electromotive force of the heater circuit such that the resultant electromotive force of the thermopile 5 at the predetermined desired maximum velocity will be zero, thus changing the position to which the galvanometer needle 35 moves in response to any given velocity within the desired limits so as to bring the needle 35 onto the scale 36.

Although I have described my measuring device as adapted particularly for determining the velocity of flow of a fluid, it will be apparent from the foregoing description that the device is equally adapted for determining other fluid states since the response of the galvanometer is actuated by the electromotive force of the thermocouple which varies in accordance with the rate of withdrawal of heat by the fluid from the heated element. Thus, my measuring device, when the galvanometer scale is suitably calibrated, may be employed to indicate directly such other fluid states for example as the absolute pressure or the density of a given fluid. The fact that a change or variation in any of these states or characteristics will cause a variation in the rate of withdrawal of heat by the fluid from the heated body or element results in a change in the temperature of the heated body with a corresponding change in the electromotive force of the thermocouple indicated by variation in the throw of the galvanometer needle. Calibration of the galvanometer scale to read in density or pressure may be made by any of the well-known methods of calibrating such scales.

What I claim and desire to secure by Letters Patent of the United States is:

1. A device for measuring the velocity of a flowing fluid, comprising an electric circuit having a heating element therein adapted to be positioned in the flowing fluid and having means to maintain constant the current supplied to said element, thermal responsive means separate from said element and so positioned relative to said element as to respond to variation of temperature of said element due to the cooling action of the flowing fluid and adapted to be positioned in the flowing fluid, electrically operated means for measuring the variation in response of said responsive means and having a circuit controlled by said thermal means, said measurement indicating the velocity of the flowing fluid, and a resistance element separate from said heating element and common to each of said circuits for controlling the response of said electrically operated means to a given velocity.

2. A device for measuring the velocity of a flowing fluid, comprising an electric circuit having a heating element therein adapted to be positioned in the flowing fluid and having regulatable means to maintain constant the current supplied to said element, a second electric circuit including a thermocouple adapted to be positioned in the flowing fluid and having its hot junction adjacent said element, a galvanometer in circuit with said thermocouple, and means common to said circuits for imposing a counter-electromotive force on the thermocouple circuit whereby the response of said galvanometer to a given velocity is changed.

3. A device for measuring the state of a fluid, comprising an electric circuit having a heating element therein adapted to be positioned in the fluid and having means to regulate and maintain constant the current supplied to said element, a thermocouple adapted to be positioned in the fluid and having its hot junction adjacent said element, a second electric circuit including a galvanometer in circuit with said thermocouple, said first-named circuit and said second-named circuit being connected together positive to positive and negative to negative, and resistance means interposed between said connections whereby a portion of the electromotive force of said first circuit biases the electromotive force of said second circuit to regulate the response of said galvanometer to the electromotive force of the thermocouple.

4. A device for measuring the state of a fluid, comprising a rod member having an electric heating element secured to one end thereof, a thermocouple fixed to said member by said element and extending longitudinally of said rod member and having its hot junction in engagement with said element, an electric circuit having means in circuit with said element to maintain constant the current to said element, a thermocouple circuit, and means in said thermocouple circuit responsive to variation in the electromotive force of said thermocouple for indicating the state of the fluid.

5. A device for measuring the state of a fluid, comprising a hollow rod member having an electric heating element coiled about and secured to one end thereof with the element circuit lead wires extending through the bore of said member, a thermocouple fixed to and extending longitudinally of said rod member and having its hot junction positioned adjacent said element, an electric circuit having means in circuit with said element to maintain constant the current to said element, a thermocouple circuit, and means in said thermocouple circuit responsive to variation in the electromotive force of said thermocouple for indicating the state of the fluid.

6. A device for measuring the velocity of a flowing fluid, comprising a supporting member having a thermocouple extending longitudinally thereof with its hot junction adjacent one end of said member and with its cold junction intermediate the ends of said member, an electric heating element coiled about said member in overlying engagement with the hot junction of the thermocouple to secure the thermocouple to said member, said element being spaced from the cold junction, an electric circuit having means in circuit with said element to maintain constant the current to said element, and a second electric circuit having means in circuit with said thermocouple and responsive to variation in the electromotive force of said thermocouple for indicating in terms of velocity of fluid flow the variation in temperature of said element due to the cooling action of the flowing fluid.

7. A device of the character described, comprising a tubular base member defining a hand grip, a hollow rod member fixed in the bore of said base member and projecting therefrom, an electric heating element carried by said rod member and having lead wires extending through the bores of said members, a thermocouple secured externally to said rod member and having its hot junction in thermal engagement with said heating element, the cold junction of said thermocouple being remote from said element, and a guard frame surrounding said rod member.

8. A device of the character described, comprising a base member, a rod member carried by and projecting from said base member, an electric heating element carried by the free end of said rod member, and a thermopile comprising a plurality of spaced thermocouples secured externally to said rod member and having their hot junctions in thermal engagement with said element.

9. A device of the character described, comprising a supporting member having a hand grip portion, a thermocouple extending longitudinally of said member and having its hot junction adjacent one end of said member, and an electric resistance heating wire carried by said member and overlying said hot junction to secure said thermocouple to said member.

10. A device of the character described, comprising a supporting member having a hand grip portion, a thermocouple extending longitudinally of said member and having its hot junction adjacent one end of said member, an electric resistance heating wire carried by said member and overlying said hot junction to secure said thermocouple to said member, and a guard frame surrounding said one end of said member to protect said thermocouple.

11. In a device of the character described, a supporting member, a thermocouple supported by said member, and a heating element in thermal engagement with and tightly securing said thermocouple to said member.

12. A device for measuring the state of a fluid, comprising an electric heating element, means to supply current to said element, an electric measuring device, switch means to electrically connect said measuring device in shunt circuit with said heating element whereby to measure the current flow therethrough, a thermocouple having its hot junction adjacent said heating element and its cold junction spaced therefrom, switch means to electrically connect said measuring device in circuit with said thermocouple whereby to measure the electromotive force of said thermocouple, and a resistance element in circuit with said heating element and with said thermocouple, said resistance element being operable to regulate the response of the measuring device to the electromotive force of said thermocouple.

13. A device for measuring the state of a fluid, comprising an electric heating element, means to supply current to said element, a variable resistance means in circuit with said element and said first-named means to regulate the current flowing through said element, an electric measuring device, switch means to electrically connect said measuring device in shunt circuit with said heating element whereby to measure the current flow therethrough, a thermocouple having its hot junction adjacent said heating element and its cold junction spaced therefrom, switch means to electrically connect said measuring device in circuit with said thermocouple whereby to measure the electromotive force of said thermocouple, and a resistance element common to the heater circuit and the thermocouple circuit, said resistance element being operable to regulate the response of the measuring device to the electromotive force of said thermocouple.

14. A device for measuring the rate of withdrawal of heat by a fluid from a heated element, comprising an electric circuit having an element therein heated by current flow and adapted to be positioned in the heat withdrawing fluid, a second electric circuit including a thermocouple having its hot junction positioned to be influenced by the heat of said element, a galvanometer in circuit with said thermocouple, and means common to said circuits for imposing a counter-electromotive force on the thermocouple circuit whereby to regulate the response of said galvanometer to the rate of heat withdrawal by the fluid.

15. A device for measuring the rate of withdrawal of heat by a fluid from a heated element, comprising an electric circuit having an element therein heated by current flow and adapted to be positioned in the heat withdrawing fluid, a thermocouple having its hot junction positioned to be influenced by the heat of said element, a second electric circuit including a galvanometer in circuit with said thermocouple, said first-named circuit and said second-named circuit being connected together positive to positive and negative to negative, and electric resistance means joining and electrically connected to said connections whereby a portion of the electromotive force of said first circuit biases the electromotive force of said second circuit thereby to regulate the response of said galvanometer to the rate of heat withdrawal from said element.

DANIEL D. WILE.